(12) United States Patent
Abhyankar et al.

(10) Patent No.: US 12,305,650 B2
(45) Date of Patent: May 20, 2025

(54) CONTROL SYSTEM FOR A FLUID MANAGEMENT SYSTEM

(71) Applicant: Eaton Intelligent Power Limited, Dublin (IE)

(72) Inventors: Sneha Abhyankar, Pune (IN); Gurmeet Singh, Pune (IN); Santosh Kr Sharma, Pune (IN); Swetha Prakash, Pune (IN); Amresh Kumar, Bihar (IN); Ragini Jain, Pune (IN); Steven Andrew Dimino, Wauwatosa, WI (US); David Glenn Loucks, Coraopolis, PA (US)

(73) Assignee: Eaton Intelligent Power Limited, Dublin (IE)

( * ) Notice: Subject to any disclaimer, the term of this patent is extended or adjusted under 35 U.S.C. 154(b) by 636 days.

(21) Appl. No.: 17/380,531

(22) Filed: Jul. 20, 2021

(65) Prior Publication Data

US 2022/0025891 A1    Jan. 27, 2022

Related U.S. Application Data

(60) Provisional application No. 63/056,026, filed on Jul. 24, 2020.

(51) Int. Cl.
*F04D 15/00* (2006.01)
*F04D 13/06* (2006.01)

(52) U.S. Cl.
CPC ......... *F04D 15/0066* (2013.01); *F04D 13/06* (2013.01)

(58) Field of Classification Search
CPC .. F04D 13/06; F04D 15/0066; F04D 16/0088; F04D 15/00; F04B 13/06; F04B 15/0066; F04B 16/0088
See application file for complete search history.

(56) References Cited

U.S. PATENT DOCUMENTS

| 5,015,151 A | 5/1991 | Snyder, Jr. et al. |
| 5,742,500 A * | 4/1998 | Irvin ........................ G05D 9/12 700/282 |
| 5,945,802 A | 8/1999 | Konrad et al. |

(Continued)

FOREIGN PATENT DOCUMENTS

| CN | 201758362 U | 3/2011 |
| CN | 107023497 B | 8/2017 |

(Continued)

*Primary Examiner* — Philip E Stimpert
(74) *Attorney, Agent, or Firm* — DiBerardino McGovern IP Group LLC

(57) ABSTRACT

A control system includes: a controller configured to: access an estimated torque and estimated speed of a motor mechanically coupled to an impeller of a centrifugal machine; access at least one set of pre-determined performance data values associated with a known speed of the impeller, where each set of pre-determined performance data values includes: a plurality of flowrate values and a plurality of performance metric values; determine an operating point of the centrifugal machine based on the estimated torque, the estimated speed, and the at least one set of pre-determined performance data values; compare the determined operating point to a best efficiency point (BEP) associated with the centrifugal machine; and determine whether to change the speed of the motor based on the comparison.

20 Claims, 12 Drawing Sheets

(56) References Cited

U.S. PATENT DOCUMENTS

| | | | |
|---|---|---|---|
| 6,330,525 B1 | 12/2001 | Hays et al. | |
| 6,591,697 B2 * | 7/2003 | Henyan | G01F 1/28 |
| | | | 73/861.71 |
| 6,648,606 B2 | 11/2003 | Sabini et al. | |
| 6,757,665 B1 | 6/2004 | Unsworth et al. | |
| 6,933,693 B2 | 8/2005 | Schuchmann | |
| 6,941,785 B2 | 9/2005 | Haynes et al. | |
| 7,112,037 B2 | 9/2006 | Sabini et al. | |
| 7,945,411 B2 | 5/2011 | Kernan et al. | |
| 8,203,298 B2 | 6/2012 | Lu et al. | |
| 9,382,903 B2 | 7/2016 | Ahola et al. | |
| 2005/0252205 A1 * | 11/2005 | Stavale | F04D 15/0066 |
| | | | 60/445 |
| 2008/0240931 A1 | 10/2008 | Kallesoe | |
| 2017/0184111 A1 | 6/2017 | Brookes et al. | |
| 2018/0372124 A1 | 12/2018 | Wang | |

FOREIGN PATENT DOCUMENTS

| | | |
|---|---|---|
| EP | 3388676 A1 | 10/2018 |
| EP | 2145112 B1 | 11/2018 |
| IN | 288510 | 10/2017 |
| JP | 4007424 B2 | 11/2007 |
| JP | 4804747 B2 | 11/2011 |
| JP | 5184417 B2 | 4/2013 |
| JP | 5396503 B2 | 1/2014 |
| JP | 5396504 B2 | 1/2014 |
| KR | 101284606 B1 | 7/2013 |
| KR | 101776163 B1 | 9/2017 |
| WO | 2018197033 A1 | 11/2018 |

\* cited by examiner

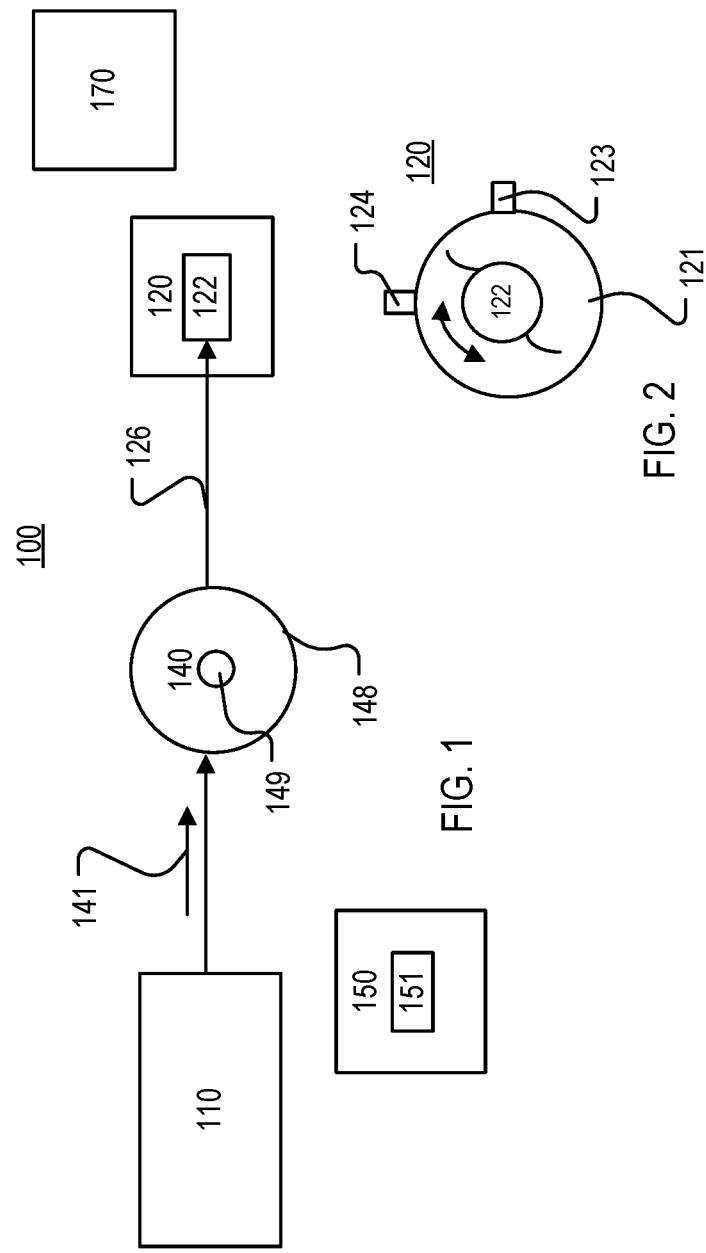

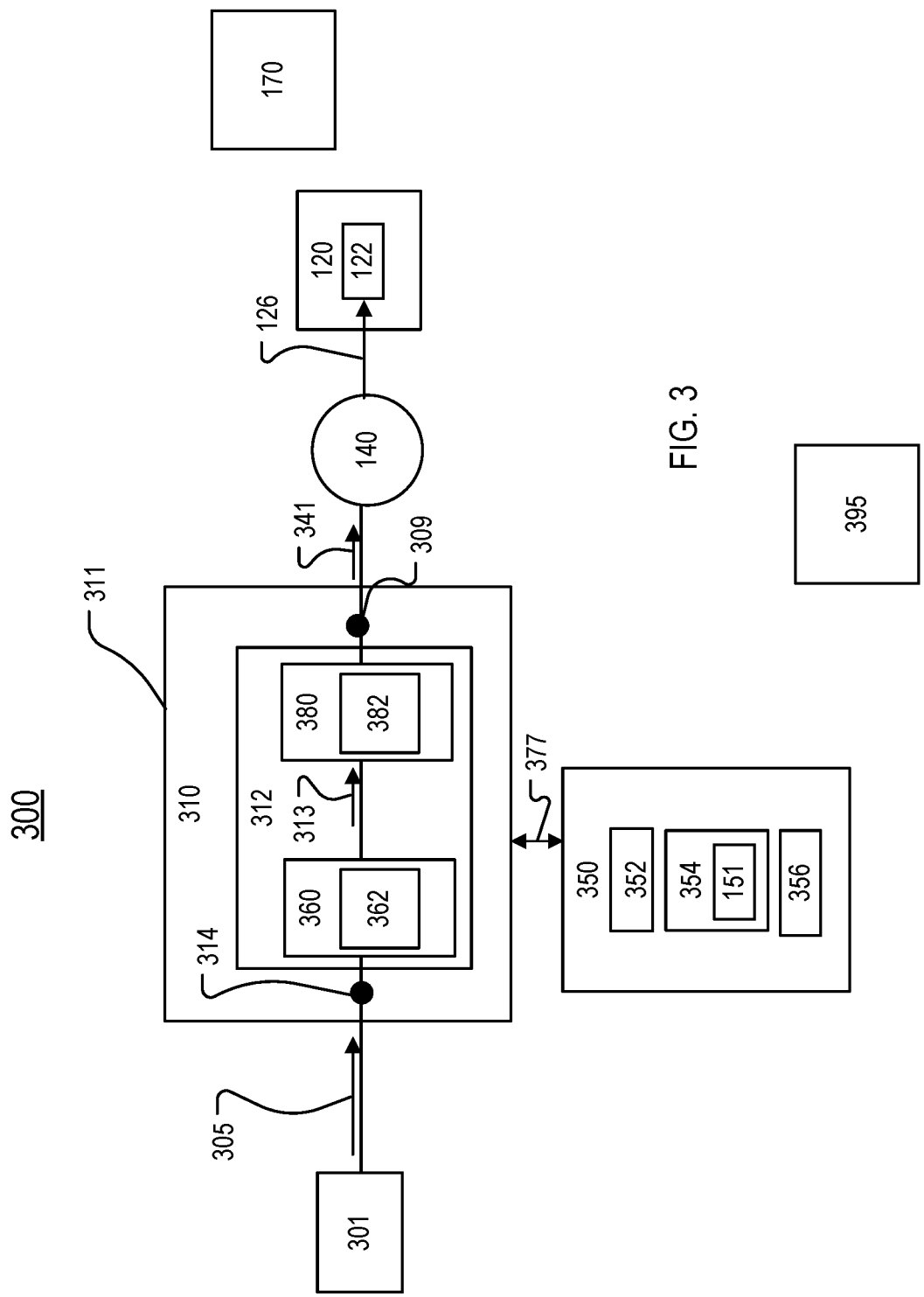

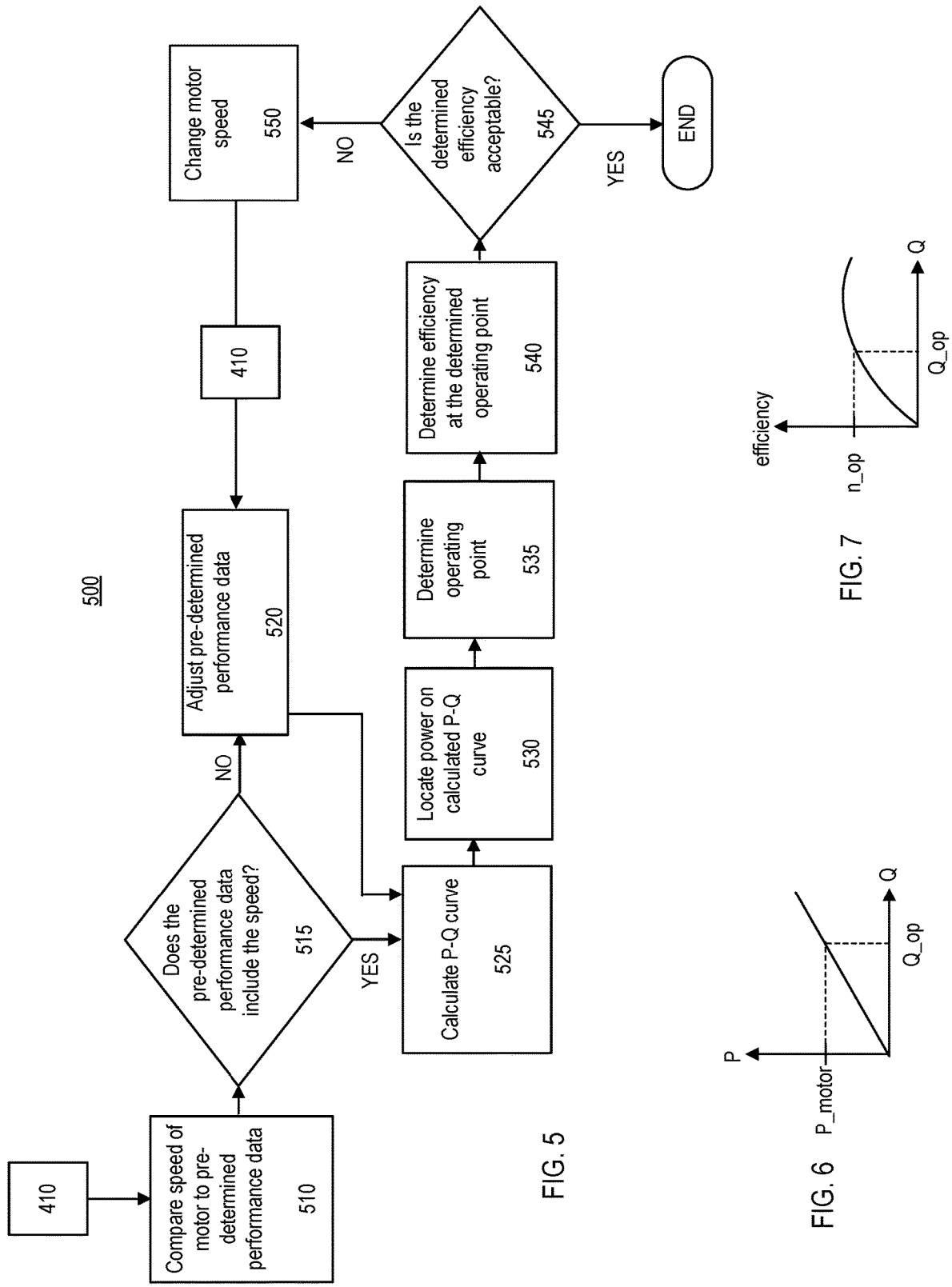

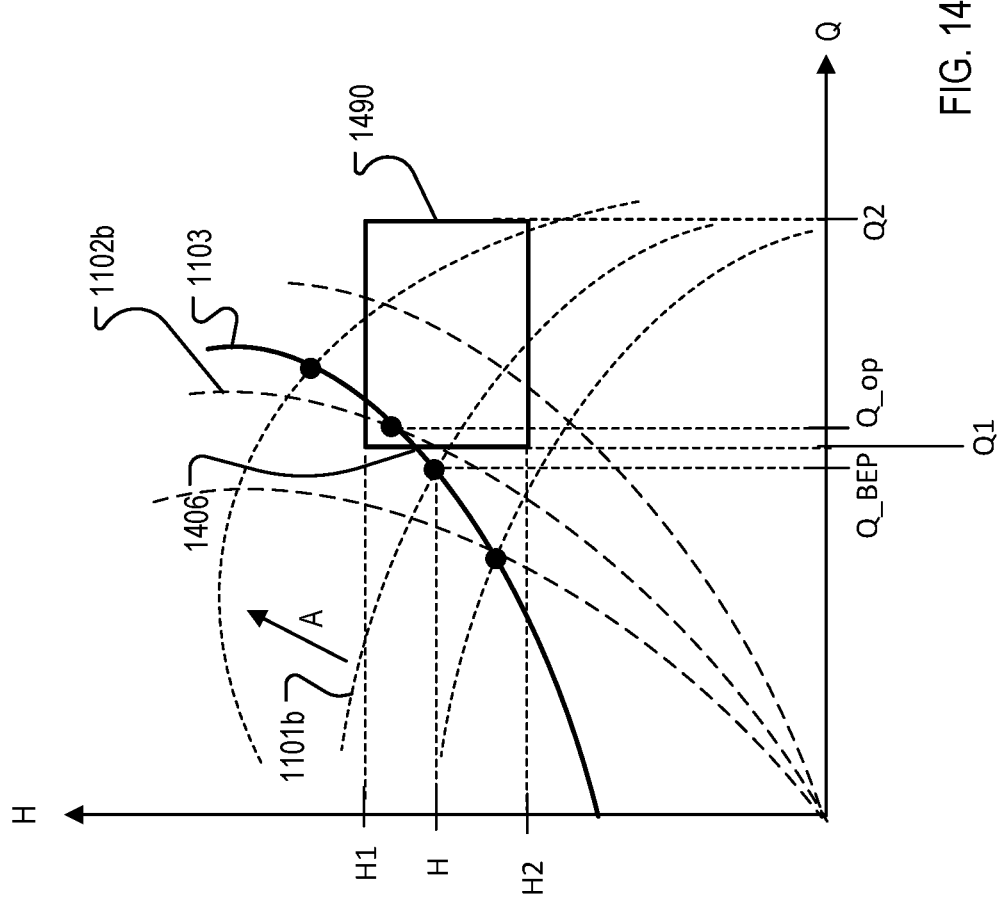

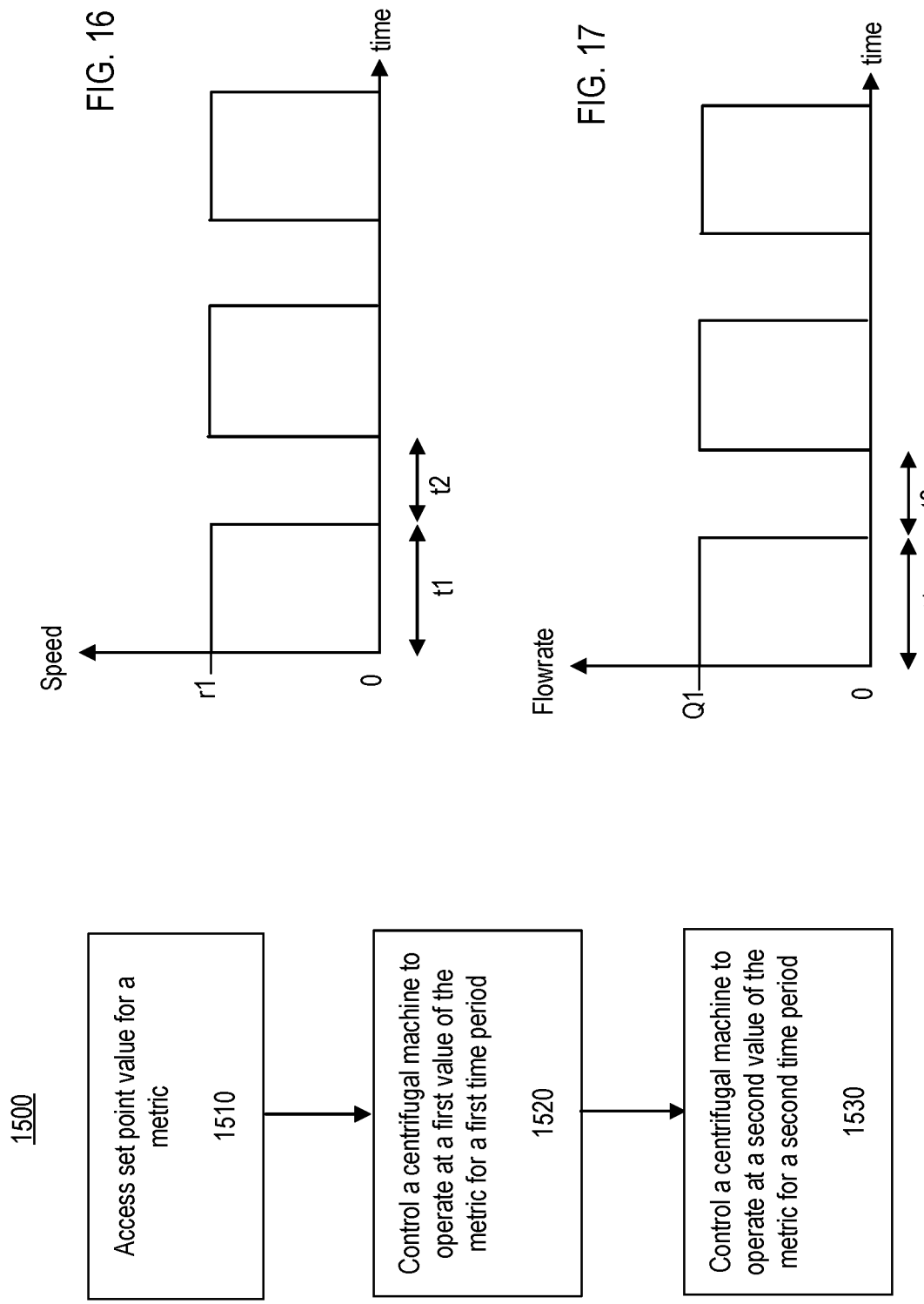

CONTROL SYSTEM FOR A FLUID MANAGEMENT SYSTEM

CROSS-REFERENCE TO RELATED APPLICATION

This application claims the benefit of U.S. Provisional Application No. 63/056,026, filed on Jul. 24, 2020 and titled CONTROL SYSTEM FOR A FLUID MANAGEMENT SYSTEM, which is incorporated herein by reference in its entirety.

TECHNICAL FIELD

This disclosure relates to a control system for a fluid management system.

BACKGROUND

An electric motor converts electrical energy into mechanical energy that is provided to an impeller of a centrifugal machine. The centrifugal machine may be part of a fluid management system.

SUMMARY

In one aspect, a control system includes: a controller configured to: access an estimated torque and estimated speed of a motor mechanically coupled to an impeller of a centrifugal machine; access at least one set of pre-determined performance data values associated with a known speed of the impeller, where each set of pre-determined performance data values includes: a plurality of flowrate values and a plurality of performance metric values; determine an operating point of the centrifugal machine based on the estimated torque, the estimated speed, and the at least one set of pre-determined performance data values; compare the determined operating point to a best efficiency point (BEP) associated with the centrifugal machine; and determine whether to change the speed of the motor based on the comparison.

Implementations may include one or more of the following features. The controller may be configured to access a plurality of sets of pre-determined data values associated with the centrifugal machine, and, in these implementations, each one of the plurality of sets may be associated with a different known speed of the impeller, and the performance metric values may include head values and efficiency values. The controller may be further configured to compare the estimated speed of the motor to the known speed of the impeller; and if the estimated speed of the motor and the known speed are similar to within a speed threshold, the controller may determine a machine power characteristic based on the pre-determined head values and the pre-determined efficiency values; and if the estimated speed of the motor and the known speed are not similar to within the speed threshold, the controller may determine an updated set of head values, and an updated set of efficiency values; and the controller may determine the machine power characteristic based on the updated set of head values and the updated set of efficiency values. The controller also may be further configured to determine a power value on the machine power characteristic that corresponds to the estimated torque and to determine a flowrate operating point, the flowrate operating point being the flowrate value that corresponds to the determined power value. To determine the operating point of the centrifugal machine, the controller may be configured to determine an efficiency operating point and a head operating point based on the flowrate operating point. To compare the the determined operating point to the best efficiency point (BEP), the controller may be configured to compare the determined efficiency operating point to the best efficiency point (BEP). If the controller changes the speed of the motor, after changing the speed of the motor, the controller may be further configured to: to determine an updated set of head values at the flowrate values and an updated set of efficiency values at the flowrate values; and update the machine power characteristic based on the updated set of head values and the updated set of efficiency values.

The controller may change the speed of the motor to thereby change a flowrate of a fluid that is moved by the impeller, and the controller also may be further configured to determine the efficiency operating point again after changing the speed of the motor.

In another aspect, a control system for a pump system includes a controller configured to: determine whether a current operating point of the pump system is in a bounded operating region, where the current operating point includes a current value of a flowrate of fluid moved by the pump system and a current value of a performance metric; and the bounded operating region is defined by a minimum value of the flowrate, a maximum value of the flowrate, a minimum value of the performance metric, and a maximum value of the performance metric; and if the current operating point is not in the bounded operating region, the controller is configured to adjust a parameter of a motor that is mechanically coupled to the pump system to thereby change the current operating point until the current operating point is in the bounded operating region.

Implementations may include one or more of the following features. The controller may be configured to compare the current value of the flowrate of the fluid moved by the pump system to a best efficiency point flowrate associated with the pump system before determining whether the current operating point is in the bounded operating region; if the the current flowrate is less than the best efficiency point flowrate, the controller may increase a speed of the motor before determining whether the current operating point is in the bounded operating region; and if the current flowrate is greater than the best efficiency point flowrate, the controller may decrease the speed of the motor before determining whether the current operating point is in the bounded operating region. The parameter of the motor may include the speed of the motor; and if the current operating point is not within the bounded operating region and the current flowrate is less than the best efficiency point flowrate, the controller may decrease the speed of the motor until the current operating point is in the bounded operating region; and if the current operating point is not within the bounded operating region and the current flowrate is greater than the best efficiency point flowrate, the controller may increases the speed of the motor until the current operating point is in the bounded operating region.

The control system may also be configured to determine whether the current value of the performance metric is acceptable. The performance metric may include an operating efficiency, and to determine whether the current value of the operating efficiency is acceptable, the controller may be configured to compare the current value of the operating efficiency to a best efficiency point. The current value of the operating efficiency may be considered to be acceptable if a difference between the current value of the operating efficiency and the best efficiency point is less than an efficiency threshold. The performance metric may be a flowrate or an operating head.

In some implementations, one or more of the minimum flowrate, the maximum flow rate, the minimum value of the performance metric, and the maximum value of the performance metric are set by an operator of the pump system.

In another aspect, a set point value for a flowrate of fluid moved by a centrifugal machine is accessed; a duration of a first time period and a duration of a second time period are determined based on the set point value for the flowrate and a best efficiency point flowrate for the centrifugal machine; the centrifugal machine is controlled to operate at the best efficiency point flowrate for the duration of the first time period; and the centrifugal machine is controlled to operate at zero flowrate for the duration of the second time period. The duration of the first time period and the duration of the second time period are such that the average flowrate of the fluid over the first and second time periods is the set point value of the flowrate.

Implementations may include one or more of the following features. The first time period may be immediately before the second time period. The set point value for the flowrate may be received from an operator of the centrifugal machine. The centrifugal machine may be controlled by controlling a motor controlling apparatus that provides a motor power signal to a motor that is mechanically coupled to an impeller of the centrifugal machine.

Implementations of any of the techniques described herein may include an apparatus, a device, a controller, a control system, a fluid management system, and/or a method. The details of one or more implementations are set forth in the accompanying drawings and the description below. Other features will be apparent from the description and drawings, and from the claims.

DRAWING DESCRIPTION

FIG. 1 is a block diagram of an example of a fluid management system.

FIG. 2 is a block diagram of an example of a centrifugal machine.

FIG. 3 is a block diagram of another example of a fluid management system.

FIGS. 4 and 5 are flowcharts of example processes.

FIG. 6 is an example of a P-Q curve.

FIG. 7 is an example of an efficiency curve.

FIGS. 11-14 are illustrations of other examples of performance characteristic curves for a centrifugal machine.

FIG. 15 is a flowchart of another example process.

FIG. 16 is an example of a plot of speed of an impeller as a function of time.

FIG. 17 is an example of a plot of flowrate of a centrifugal machine as a function of time.

DETAILED DESCRIPTION

Figure 4:
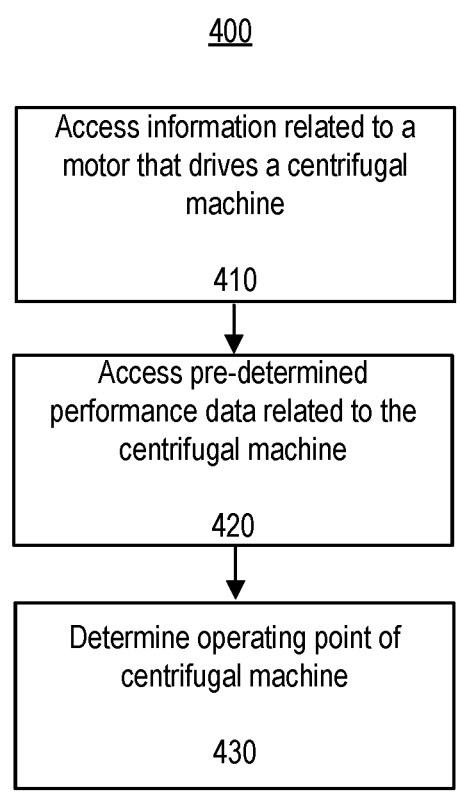

Referring to FIG. 1, a block diagram of a fluid management system 100 is shown. The fluid management system 100 may be, for example, a pumping system. The fluid management system 100 includes a centrifugal machine 120 that is used to move fluid in a process 170. The process 170 may be, for example, an industrial, commercial process, or a residential process. The process 170 may be a chilling system; a heating, ventilation, and cooling (HVAC) system; a wastewater or waste fluid processing system; a chemical processing system; or a filtration system, just to name a few.

The fluid management system 100 includes a controller 150. As discussed below, the controller 150 determines the operating point of the centrifugal machine 120 without relying on sensors (such as flow meters and pressure sensors). Moreover, the controller 150 determines the operating point using pre-determined performance data 151, which is determined prior to the machine 120 being deployed into the system, and without performing a characterization of the centrifugal machine 120 after the centrifugal machine 120 has been deployed into the system 100. The controller 150 also enables more efficient operation of the centrifugal machine 120.

The centrifugal machine 120 is driven by a motor 140. The motor 140 may be a direct current (DC) motor or an alternating current (AC) motor. For example, the motor 140 may be a brushless DC motor, a permanent magnet AC motor, or an AC induction motor, just to name a few. The motor 140 may be a single-phase motor or a multi-phase motor. Although FIG. 1 shows one motor, the fluid management system 100 may include more than one motor. The fluid management system 100 also includes a motor controlling apparatus 110, which provides a motor power signal 141 to the motor 140. The motor controlling apparatus 110 is any type of apparatus configured to drive the motor 140. For example, the motor controlling apparatus 110 may be a variable frequency drive (VDF) or an adjustable speed drive (ASD).

The motor power signal 141 is an AC electrical signal that has a voltage (V) and current (i) sufficient to drive the motor 140. In implementations in which the motor 140 is a multi-phase motor, the motor power signal 141 is a multi-phase AC electrical signal. The motor 140 includes a stator 148 and a rotor 149. The stator 148 includes one winding per phase. The rotor 149 rotates relative to the stator 148 in response to receiving the motor power signal 141. The direction and speed of the rotor 149 are determined by the characteristics (amplitude, frequency, and/or phase) of the motor power signal 141.

The centrifugal machine 120 is any type of centrifugal machine. For example, the centrifugal machine 120 may be a pump, a blower, or a compressor. Referring also to FIG. 2, the centrifugal machine 120 includes a body 121, an inlet 123 though which fluid flows into the body 121, an outlet 124 through which fluid flows out of the body 121, and an impeller 122. The impeller 122 is coupled to the rotor 149 via a linkage 126. The linkage 126 is any type of connection capable of transferring the mechanical energy generated by the motor 140 to the impeller 122. For example, the linkage 126 may include a rod, gears, a shaft, or a combination of such devices. The rotation of the impeller 122 imparts rotational energy to the fluid in the body 121 and transports the fluid in the body 121 between the inlet 123 and the outlet 124.

The centrifugal machine 120 is associated with performance metrics, including head (H) and efficiency. The efficiency of the centrifugal machine 120 is the relationship between the input horsepower (which is the input torque multiplied by the rotational speed of the impeller 122) and the flowrate (Q). The head (H) of the machine 120 is the amount of pressure P required to achieve a given flowrate (Q) at the outlet 124. The flowrate (Q) has units of volume over time, for example, cubic meters per second. The head (H) has units of pressure, for example, pounds per square inch or Pascals. The rotational speed or speed of the impeller 122 is expressed as rotations per unit of time. The relationship between head (H) and flowrate (Q) is referred to as the H-Q curve. The centrifugal machine 120 is also associated with a system head (Hsys), which is the opposition to the flow that is created by increasing the head (H). The system head (Hsys) accounts for the configuration and components used with the centrifugal machine 120 (such as piping or other types of transfer systems that convey fluid between the outlet 124 and the process 170). The system head (Hsys) curve intersects the H-Q curve at the operation points of the centrifugal machine 120.

The centrifugal machine 120 is associated with the pre-determined performance data 151. The pre-determined performance data 151 is provided by the manufacturer of the centrifugal machine 120 and is collected before the centrifugal machine 120 is placed into service in the fluid management system 100.

FIGS. 4, 5, 9, 10, and 15 show flow charts of processes for determining the operating point of the centrifugal machine 120 during use and/or controlling the operation of the centrifugal machine 120. Prior to discussing these techniques, an overview of an example implementation of the motor controlling apparatus 110 and the controller 150 is discussed with respect to FIG. 3.

FIG. 3 is a block diagram of a fluid management system 300 that includes a controller 350. The controller 350 is an implementation of the controller 150 (FIG. 1). The fluid management system 300 includes a motor controlling apparatus 310 that is coupled to the motor 140 via an electrical connection such as, for example, an electrical cable. The motor controlling apparatus 310 may be, for example, a variable speed drive (VSD), an adjustable speed drive (ASD), or a variable frequency drive (VFD). The motor controlling apparatus 310 provides a motor power signal 341 to the motor 140. The motor 140 drives the centrifugal machine 120.

The motor controlling apparatus 310 receives AC electrical power from an electrical power distribution network 301, which may be, for example, a multi-phase electrical power grid that provides electricity to industrial, commercial, and/or residential customers. The AC electrical power distribution network 301 distributes AC electrical power that has a fundamental frequency of, for example, 50 or 60 Hertz (Hz). The distribution network 101 may have an operating three-phase line-to-line voltage of, for example, up to 690 volt (V) root mean square (RMS) for low voltage, and above 690V (for example, 10 kV) for medium or high voltage. The network 301 may include, for example, one or more transmission lines, distribution lines, power distribution or substation transformers, electrical cables, and/or any other mechanism for transmitting electricity.

The motor controlling apparatus 310 includes an electrical network 312 that receives AC electrical power 305 from the distribution network 301 at an input node 314. The motor controlling apparatus 310 is enclosed in a housing or enclosure 311. The housing 311 is a three-dimensional body made of a solid and rugged material that protects the electrical network 312. The motor controlling apparatus 310 also includes an output node 309. The motor 140 connects to the motor controlling apparatus 310 at the output node 309.

The electrical network 312 generates the AC motor power signal 341 based on the AC electrical power 305 from the distribution network 301. The electrical network 312 includes a converter 360 and an inverter 380. The converter 360 includes an electrical network 362 configured to convert the AC electrical power 305 into direct current (DC) electrical power 313. The converter 360 may be, for example, an active front end (AFE) or pulse width modulation (PWM) rectifier, or an 18-pulse rectifier. The electrical network 362 includes electronic components such as diodes arranged to form a rectifier or in any other configuration that allows the AC electrical power 305 to be converted into the DC electrical power 313.

The inverter 380 includes an electrical network 382 configured to convert the DC electrical power 313 into the AC motor power signal 341. The electrical network 382 may include power transistors or other controllable switching devices. For example, the electrical network 382 may include three half-bridge circuits that each include two switching elements (such as, for example, power transistors) connected in series. Each pair of switching elements receives a direct-current (DC) voltage from a DC power source (for example, a battery, DC power supply, or other source of DC power). In these implementations, the inverter 380 generates a three-phase pulse width modulated (PWM) signal by applying signals based on a command signal to each pair of switching elements. The characteristics (amplitude, frequency, and phase) of the three-phase PWM motor power signal 341 is determined by controlling the switching operations of the half-bridge circuits. The PWM technique may be implemented based on any type of control algorithm, such as, for example, a 6-step electronic commutation, various field oriented controls, a space vector PWM, or a sinusoidal PWM.

The controller 350 is coupled to the motor controlling apparatus 310 via a control link 377. The control link 377 is any type of pathway that is capable of carrying data, information, and/or commands. For example, the control link 377 may be an electrical cable, copper traces on a printed circuit board, or a wireless data connection. The controller 350 includes an electronic processing module 352, an electronic storage 354, and an I/O interface 356. In some implementations, the electronic processing module 352, the electronic storage 354, and the I/O interface 356 are implemented as a microcontroller. Moreover, although the controller 350 is shown as being outside of the housing 311, the controller 350 may be enclosed in the housing 311.

The electronic processing module 352 includes one or more electronic processors. The electronic processors of the module 352 may be any type of electronic processor, may be multiple types of processors, and may or may not include a general purpose central processing unit (CPU), a graphics processing unit (GPU), a microcontroller, a field-programmable gate array (FPGA), Complex Programmable Logic Device (CPLD), a digital signal processor (DSP), a microcontroller unit (MCU) and/or an application-specific integrated circuit (ASIC).

The electronic storage 354 is any type of electronic memory that is capable of storing data and instructions in the form of computer programs or software, and may include multiple types of memory. For example, the electronic storage 354 may include volatile and/or non-volatile components. The electronic storage 354 and the processing module 352 are coupled such that the processing module 352 is able to read data from and write data to the electronic storage 354.

The processes 400, 500, 900, 1000, and 1500 may be implemented as a collection of instructions that are stored on the electronic storage 354 and executed by the electronic processing module 352. Additionally, the PWM technique or other control technique to drive the electronic network 382 of the inverter 380 may be implemented as a collection of executable instructions or computer software that is stored on the electronic storage 354.

Furthermore, the pre-determined performance data 151 may be stored on the electronic storage 354. The pre-determined performance data 151 includes N data values of the head (H), where N is any integer number that is greater than two, and each of the N data values corresponds to a flowrate at the outlet 124 for a particular rotational speed of the impeller 122. For example, if N is 5, the pre-determined performance data 151 includes five (5) values of the head (H), with each of the five values of the head (H) being for a different flowrate at a particular rotational speed of the impeller 122. The pre-determined performance data 151 also includes efficiency values for the machine 120. The efficiency values provide a relationship between efficiency and flowrate. The efficiency values also include a best efficiency point (BEP), which is the greatest efficiency at which the machine 120 is capable of operating. The BEP may be expressed as a percentage between 0% and 100% or as a value between 0 and 1.

The pre-determined performance data 151 may include M sets of pre-determined data, with each of the M sets being associated with a different speed of the impeller 122 and where M is an integer value that is greater than 1. For example, the pre-determined performance data 151 may include N pairs of head (H), flowrate (Q) values at each of M different speeds of the impeller 122. The M speeds that are part of the pre-determined performance data 151 are referred to as the M pre-determined impeller 122 speeds. Each of the M different speeds of the impeller 122 is associated with a BEP flowrate (Q_BEP). The BEP flowrate for a particular impeller 122 speed is the flowrate at which the centrifugal machine 120 is the most efficient. The BEP flowrate (Q_BEP) varies with impeller 122 speed.

The pre-determined performance data 151 may be stored as a collection of discrete values. For example, the pre-determined performance data 151 may be a collection of M sets of N pairs of data values in which each pair includes a value of a metric (for example, head (H) or efficiency) paired with an associated value of flowrate (Q). The pre-determined performance data 151 may be stored in a lookup table or a database. In some implementations, the pre-determined performance data 151 is alternatively or additionally stored in the form of an equation that relates one of the metrics (for example, head (H) or efficiency) to flowrate (Q).

The I/O interface 356 is any interface that allows a human operator, an external device, and/or an autonomous process to interact with the controller 350. The I/O interface 356 may include, for example, audio input and/or output (such as speakers and/or a microphone), visual output (such as lights, light emitting diodes (LED)), serial or parallel port, a Universal Serial Bus (USB) connection, and/or any type of network interface, such as, for example, Ethernet. The I/O interface 356 also may allow communication without physical contact through, for example, an IEEE 802.11, Bluetooth, cellular, or a near-field communication (NFC) connection. The controller 350 may be, for example, operated, configured, modified, or updated through the I/O interface 356.

In some implementations, the I/O interface 356 enables the controller 350 to communicate with a remote station 395. The remote station 395 may be any type of station through which an operator is able to communicate with the controller 350 without making physical contact with the controller 350. For example, the remote station 395 may be a computer-based work station, a smart phone, tablet, or a laptop computer that connects to the controller 350 via a services protocol, or a remote control that connects to the controller 350 via a radio-frequency signal.

FIG. 4 is a flowchart of a process 400. The process 400 is an example of a process for determining the operating point of the centrifugal machine 120. The process 400 may be performed by the controller 150 or the controller 350. For example, machine-readable instructions to implement the process 400 may be stored on the electronic storage 374 and executed by the electronic processing module 372. The process 400 is discussed with respect to the fluid management system 300; however, the process 400 may be applied to other fluid management systems.

Information related to the motor 140 is accessed (410). The accessed information includes a speed of the motor 140 (a rotational speed of the rotor 149) and a torque produced by the motor 140 while the motor 140 is operational and is receiving the motor power signal 341. The speed of the motor 140 and the torque produced by the motor 140 may be obtained in any manner known in the art.

In some implementations, the speed of the motor 140 and the torque produced by the motor 140 are estimated from the motor power signal 341 without using speed or torque sensors. For example, the speed of the motor 140 and the torque of the motor 140 may be estimated based on the value or amplitude of the voltage of the motor power signal 341, the frequency of the voltage and/or current of the motor power signal 341, the load value of the motor 140 (which may be sensed directly by a power sensor or approximated to be equal to the input power), and on the nameplate data associated with the motor 140. The nameplate data includes a rated power, a rated speed, a rated frequency, and a rated voltage of the motor 140. An example of such a technique for estimating the speed of the motor 140 and the torque of the motor 140 is provided in U.S. Pat. No. 8,203,298. The nameplate information and instructions for estimating the speed and torque may be stored on the electronic storage 354 and executed by the electronic processing module 352.

In other examples, the estimated speed and torque are determined by a separate controller and provided to the controller 350 via the I/O interface 356. In still other implementations, the operator of the fluid management system 300 may provide estimated values of the speed and torque of the motor 140 to the controller 350 via the I/O interface 356. Furthermore, in some implementations, the torque and/or speed of the motor 140 is determined based on a prior estimated, entered, or known value of the torque and/or speed. For example, the motor 140 speed may be increased or decreased by a known constant amount compared to the prior speed. In these implementations, the current speed of the motor 140 is determined by adding or subtracting the known amount from the prior speed value.

The pre-determined performance data 151 is accessed (420). The pre-determined performance data 151 may include, for example, five (5) values of the head (H) of the machine 120 for five corresponding flowrates (Q), and five values of the efficiency of the machine 120 for five corresponding flowrates (Q).

The operating point of the machine 120 is determined (430). The operating point is determined based on the measured or estimated speed and torque of the motor 140 from (410) and the accessed pre-determined performance data 151 from (420). The operating point determination does not rely on sensors associated with the machine 120. For example, the operating point is determined without using a flowmeter or a pressure meter at the inlet 123 or the outlet 124. Furthermore, in implementations in which no sensors are used to estimate the speed and torque of the motor 140, the operating point is determined or estimated solely from the motor power signal 341 and information about the motor 140. A detailed example of determining the operating point of the machine 120 is provided with respect to FIG. 5.

FIG. 5 is a flow chart of a process 500. The process 500 is another example of a process for determining an operating point of the centrifugal machine 120. The process 500 may be performed by the controller 150 or the controller 350. For example, machine-readable instructions to implement the process 500 may be stored on the electronic storage 374 and executed by the electronic processing module 372. The process 500 is discussed with respect to the fluid management system 300; however, the process 500 may be applied to other fluid management systems.

The estimated speed (rpm_est) and torque (P_est) of the motor 140 are available based on element (410) discussed above with respect to FIG. 4. The speed (rpm_est) of the motor 140 is compared to the M pre-determined impeller 122 speeds (510). Specifically, the controller 350 determines whether or not the estimated speed of the motor 140 (rpm_est) corresponds to any of the M pre-determined impeller 122 speeds (515). For example, in some implementations, the linkage 126 is configured such that the speed of the rotor 149 is the same as the speed of the impeller 122. In these implementations, the estimated speed (rpm_est) is compared to the M pre-determined impeller 122 speeds directly. For example, the estimated speed (rpm_est) may be subtracted from each of the M pre-determined impeller 122 speeds to determine whether the estimated speed (rpm_est) is the same as one of the M pre-determined impeller 122 speeds. In other implementations, the linkage 126 transfers mechanical energy of the rotor 149 to the impeller 122 in a more complex manner (for example, through a gear system), and the speed of the rotor 149 is not the same as the speed of the impeller 122. In these implementations, the estimated speed (rpm_est) of the rotor 149 is first adjusted to account for the effects of the linkage 126, and then the adjusted estimated speed is compared to the M pre-determined impeller 122 speeds to determine whether the estimated speed (rpm_est) corresponds to one of the M pre-determined impeller 122 speeds.

The scenario in which the estimated speed (rpm_est) corresponds to one of the M pre-determined impeller speeds is discussed first.

If the estimated speed (rpm_est) is the same as or within a threshold difference of the M pre-determined impeller 122 speeds, then the process 500 calculates a P-Q curve (525) using the values in the pre-determined performance data 151 that are associated with that pre-determined impeller 122 speed. The P-Q curve is power (P), for example, in units of watts, used by the machine 120 as a function of flowrate (Q). The P-Q curve may be determined using Equation 1:

$$P_k = \frac{H_k Q_k \rho g}{\eta_k}, \qquad \text{Equation (1)}$$

where k is an integer indexing value that is between 1 and N, P is the power used by the centrifugal machine 120, Q is the flowrate, H is the head (H) at the flowrate Q, $\rho$ is the density of the fluid in the body 121, g is the acceleration of gravity, and $\eta$ is the efficiency of the machine 120. The N values of Q and H in Equation 1 are from the pre-determined performance data 151 at the pre-determined impeller 122 speed that corresponds to the estimated motor speed (rpm_est). The pre-determined performance data 151 also includes efficiency as a function of flowrate, and the efficiency values that correspond to the flowrates Q used in Equation (1) are obtained from the pre-determined performance data 151.

FIG. 6 shows an example of a determined P-Q curve 604. The P-Q curve 604 is found by determining N values of P using Equation 1 and then determining a relationship between the N values of P and the N values of Q. The relationship may be found by any type of curve fitting or data fitting technique. In the example of FIG. 6, the power (P) required by the centrifugal machine 120 increases linearly with the flowrate (Q).

The motor power used by the centrifugal machine 120 is located on the determined P-Q curve (530). The power provided by the motor 140 is related to the torque and speed of the motor according to Equation 2:

$$P\_motor = torque \ast speed \qquad \text{Equation (2)}.$$

The estimated torque of the motor 140 (P_est) and the estimated speed of the motor 140 (rpm_est) are known from (410). Thus, the power provided to the centrifugal machine 120 (P_motor) can be determined from Equation 2. After determining (P_motor), the corresponding operating flowrate (Q_op) is determined from the P_Q curve. Referring again to FIG. 6, Q_op is shown on the horizontal axis.

The operating point of the centrifugal machine 120 is determined (535). Because the estimated motor speed (rpm_est) was determined to correspond to one of the M pre-determined impeller 122 speeds, the pre-determined performance data 151 includes values of the head (H) and values of the efficiency of the centrifugal machined 120 as a function of flowrate (Q) for (rpm_est). Thus, the head (H) and efficiency of the centrifugal machine 120 at the current flowrate (Q_op) can be determined. The operating point may be head (H) and the corresponding flowrate (Q_op) and/or an efficiency value ($\eta$_op) and the corresponding flowrate (Q_op). FIG. 7 illustrates the determination of the operating efficiency ($\eta$_op) using an efficiency curve derived from efficiency data included in the pre-determined performance data 151.

The controller 350 determines whether or not the operating efficiency ($\eta$_op) is acceptable (545). To determine whether the operating efficiency ($\eta$_op) is acceptable, the controller 350 compares the operating efficiency ($\eta$_op) to the best efficiency point (BEP) of the centrifugal machine 120. For example, the operating efficiency ($\eta$_op) may be compared to the BEP by subtracting the operating efficiency ($\eta$_op) from the BEP, determining a ratio between the operating efficiency ($\eta$_op) and the BEP, or by determining a percentage difference between the operating efficiency ($\eta$_op) and the BEP and comparing the result to an efficiency threshold. The efficiency threshold may be, for example, a percentage such as 1%, 2%, or 5%, or a value such as 0.01, 0.02, or 0.05. The efficiency threshold value may be stored on the electronic storage 374. The efficiency threshold value may be provided by the operator of the fluid management system 300, for example, via the I/O interface 376 such that the threshold can be adjusted depending on the application.

If the result of the comparison to the BEP is less than the efficiency threshold value, then the operating efficiency ($\eta$_op) is sufficiently close to the BEP, and the operating efficiency ($\eta$_op) of the centrifugal machine 120 is acceptable. If the operating efficiency ($\eta$_op) is acceptable, the centrifugal machine 120 is operating efficiently, and the process 500 ends or returns to (510) to continue monitoring the centrifugal machine 120.

If the operating efficiency ($\eta$_op) is not acceptable, the controller 350 changes the speed of the motor 140 (550)

such that the operating efficiency of the centrifugal machine 120 is moved closer to the BEP. Changing the speed of the motor 140 changes the speed of the impeller 122 and the operating point of the centrifugal machine 120. In other words, changing the speed of the motor 140 changes the operating efficiency ($\eta$_op). The controller 350 changes the speed of the motor 140 by controlling the inverter 380 to change the characteristics (amplitude, frequency, and/or phase) of the motor power signal 341.

After the controller 350 adjusts the motor 140, the new speed (rpm_new) and torque (torque_new) of the motor 140 are determined at (410). The data in the pre-determined performance data 151 is adjusted to account for the new speed (rpm_new) using affinity laws (520). The affinity laws are relationship between head (H), efficiency, and impeller 122 speed. The affinity laws are:

$$Q = \frac{r}{r0} Q_0, \qquad \text{Equation (3)}$$

$$H = \left(\frac{r}{r0}\right)^2 H_0, \qquad \text{Equation (4)}$$

$$P = \left(\frac{r}{r0}\right)^2 P_0, \qquad \text{Equation (5)}$$

where the subscript 0 denotes initial values, Q is the flowrate, H is the head, r is the rotational speed at which the impeller 122 is driven, and P is the mechanical power provided to the centrifugal machine 120. In this example, r0 is (rpm_est), which is the speed of the motor 140 prior to adjustment, and r is the updated estimated speed (rpm_new) determined after controlling the inverter 380 to change the speed of the motor 140. Equations 3 and 4 are used to determine an updated H-Q curve. The affinity laws assume that the efficiency of the centrifugal machine 120 remains the same even though the speed of the impeller 122 changes. Thus, the relationship between efficiency and flowrate (Q) that is included in the pre-determined performance data 151 is not updated.

An updated P-Q curve is determined (525). The P-Q curve may be determined using Equation 1, the updated H-Q curve determined using the affinity laws at (520), and the efficiency data in the pre-determined performance data 151. Alternatively, Equation 5 may be used to update the P-Q curve that was determined in the previous performance of (525).

The process 500 then proceeds to (530) to locate the power used by the centrifugal machine 120 at the updated estimated speed (rpm_new). The power (P_new) provided by the motor 140 at the updated estimated speed (rpm_new) is determined based on Equation 2. After determining the power provided to the centrifugal machine 120 at the updated speed (P_new), the updated flowrate (Q_updated) achieved by providing the power (P_new) at the updated estimated speed (rpm_new) is determined from the updated P_Q curve.

The operating point is again determined (535). To determine the operating point (accounting for the change in the speed of the impeller 122), the head (H) value that is associated with the updated flowrate (Q_updated) is determined from the updated H-Q curve found using Equations (3) and (4). The efficiency at Q_updated is determined from the efficiency curve that is included in the pre-determined performance data 151 (540). The efficiency at Q_updated is assessed to determine whether it is acceptable (545). The controller 350 continues to perform (520)-(545) in this manner until the current operating efficiency ($\eta$_op) determined at (540) is acceptable, or until the process 500 is halted (for example, by an operator).

The above discussion relates to an example in which the initial motor speed estimate (rpm_est) corresponds with one of the M pre-determined speeds. Returning to the discussion of (515), if the initial estimate of the motor speed (rpm_est) does not correspond to any of the M pre-determined impeller 122 speeds, the process 500 advances from (515) to (520) before advancing to (525). The affinity laws are applied at (520) to the H and Q values in the pre-determined performance data 151, and the P-Q curve is determined at (525) using the corrected data that results from the application of the affinity laws. The controller 350 continues to perform (520)-(545) until the operating efficiency ($\eta$_op) determined at (540) is acceptable, or until the process 500 is halted.

Figure 8:
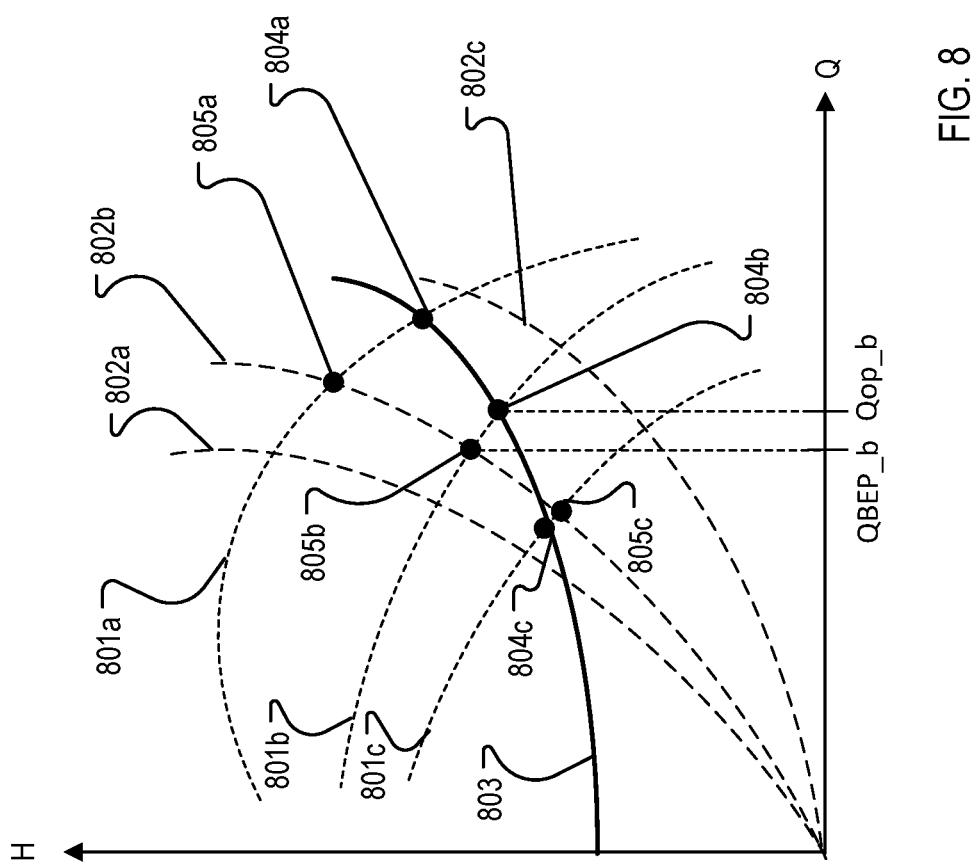
FIG. 8 is an example of a performance characteristic curve for a centrifugal machine.

FIG. 8 is an illustration of performance characteristic curves for the centrifugal machine 120. FIG. 8 includes three H-Q curves 801*a*, 801*b*, 801*c* (shown with a short dashed line style). Each of the curves 801*a*, 801*b*, 801*c* is an H-Q curve at a different speed of the impeller 122. The curve 801*a* is for a greater speed than than the curve 801*b*, and the curve 801*b* is for a greater speed than the curve 801*c*. FIG. 8 also includes three efficiency curves 802*a*, 802*b*, 802*c* (shown with a long dash line style). Each curve 802*a*, 802*b*, 802*c* represents a particular efficiency as a function of flowrate (Q). The efficiency curves 802*a*, 802*b*, 802*c* are part of the pre-determined performance data 151. In the example of FIG. 8, the curve 802*b* is for the BEP, and the curves 802*a* and 802*c* are for lower efficiencies. For example, the curve 802*b* may represent a 70% efficiency as a function of flow rate (Q) and the curves 802*a* and 802*c* may each represent 60% efficiency as a function of flow rate (Q).

FIG. 8 also includes a system head (Hsys) curve 803 (shown with a solid line style). The system head (Hsys) curve 803 is the system head (Hsys) as a function of flow rate (Q). The system head (Hsys) curve is determined by perturbing the speed of the motor 140 (for example, at 550 of the process 500) and then recalculating the operating point at (535). In the example shown in FIG. 8, (520)-(550) was performed three times and three operating points 804*a*, 804*b*, 804*c* were determined. The operating points 804*a*, 804*b*, 804*c* are where the system head curve 803 intersects the H-Q curves 802*a*, 802*b*, 802*c*. The Hsys curve is determined by performing a curve fit of the determined operating points 804*a*, 804*b*, 804*c*. The best efficiency point flowrate (Q_BEP) for a particular impeller 122 speed is the flowrate of the point where the highest efficiency curve (802*b* in this example) intersects the H-Q curve. The best efficiency point flowrates (Q_BEP) are labeled as 805*a*, 805*b*, 805*c*.

Figure 9:
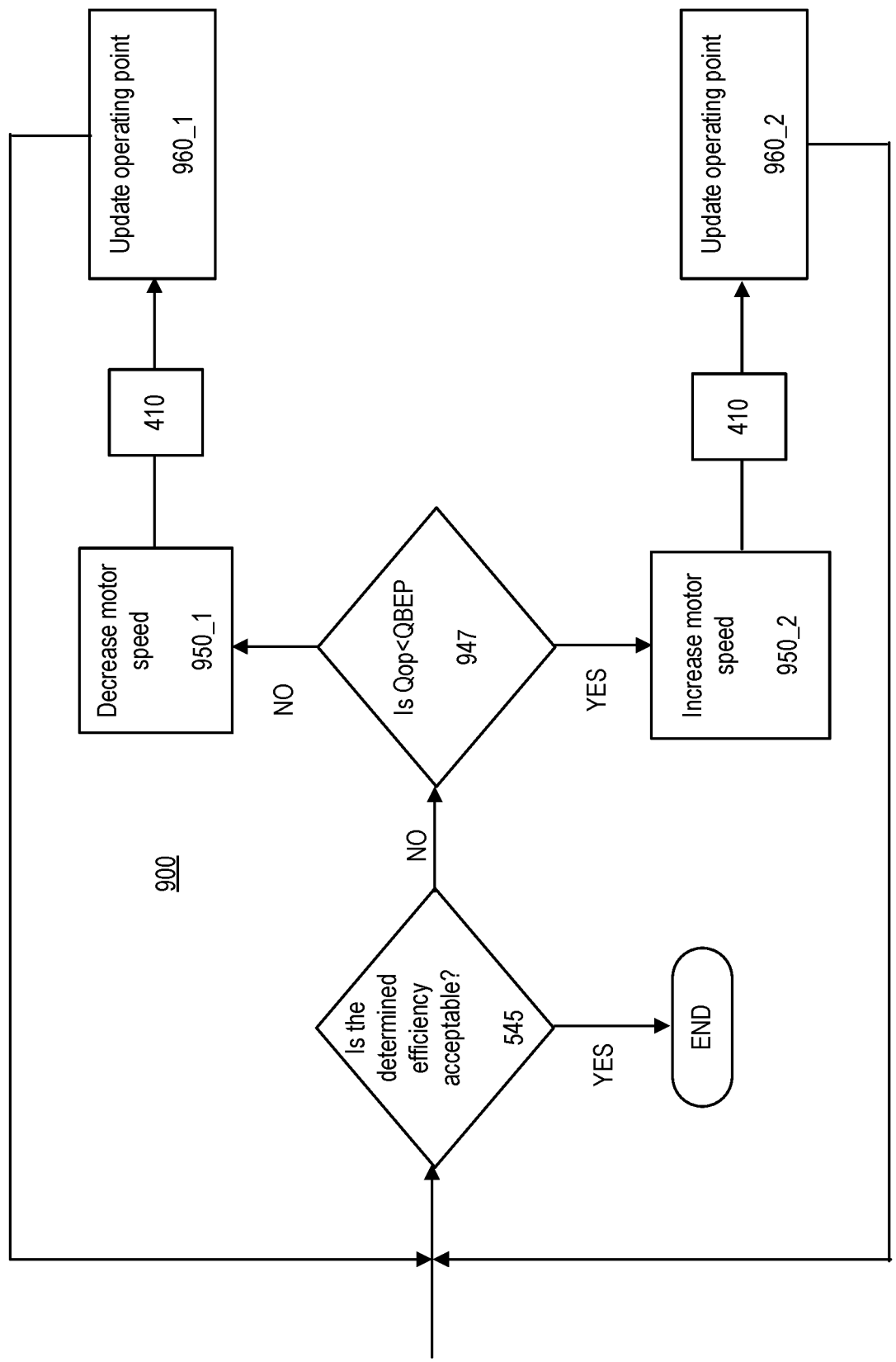
FIGS. 9 and 10 are flowcharts of other example processes.

Examples related to Q_BEP are discussed further with respect to FIG. 9. FIG. 9 is a flow chart of a process 900. The process 900 is used to adjust the speed of the motor 140 to achieve more efficient operation of the centrifugal machine 120. The process 900 may be performed by the controller 150 or the controller 350. For example, machine-readable instructions to implement the process 900 may be stored on the electronic storage 374 and executed by the electronic processing module 372. The process 900 is discussed with respect to the fluid management system 300; however, the process 900 may be applied to other fluid management systems.

The process 900 includes (545), which is discussed above. If the efficiency determined at (540) is acceptable, the process 900 ends. If the efficiency determined at (540) is not acceptable, the controller 350 compares Q_op to Q_BEP.

Q_op is the flowrate (Q) associated with the operating point determined in (535). Q_BEP is the flowrate that corresponds to the intersection between the highest efficiency curve and the H-Q curve for the speed of the impeller 122. For example, and referring to FIG. 8, if the H_Q curve 801*b* is the H-Q curve for the speed of the impeller 122, the operating point is 804*b* (corresponding to Qop_b of FIG. 8) and the BEP operating point is 805*b* (corresponding to QBEP_b of FIG. 8).

When the centrifugal machine 120 is operating at its highest efficiency, Q_op equals Q_BEP. If Q_op is not equal to Q_BEP, the speed of the motor 140 is adjusted to move Q_op closer to or equal to Q_BEP, as discussed below.

At (947) Q_op is assessed to determine if Q_op is less than Q_BEP. If Q_op is less than Q_BEP, the controller 350 increases the speed of the motor 140 (950_2). If Q_op is less than Q_BEP, the centrifugal machine 120 is oversized, and increasing the flowrate (Q) will move the operating point closer to Q_BEP. The flowrate is thus increased by increasing the speed of the motor 140.

If Q_op is greater than Q_BEP (such as in the example discussed with respect to FIG. 8), the controller decreases the speed of the motor 140 (950_1). If the Q_op is greater than the Q_BEP, the centrifugal machine 120 is undersized, and reducing the flowrate (Q) will move the operating point closer to Q_BEP. The flowrate is thus decreased by decreasing the speed of the motor 140.

The speed of the motor 140 may be decreased at (950_1) or increased at (950_2) by a pre-determined constant amount that is stored on the electronic storage 354. The amount of increase and decrease may be the same. For example, the speed of the motor 140 may be decreased at (950_1) or increased at (950_2) by 5 revolutions per minute. In other implementations, the amount at which the speed of the motor 140 is increased or decreased depends on operating conditions. For example, the amount at which the speed of the motor 140 is increased or decreased may be a fixed percentage of the current estimated speed of the motor 140.

After the speed of the motor 140 is decreased at (950_1) or increased at (950_2), the speed and torque of the motor 140 are estimated using (410). The operating point is again determined at (960_1) if the speed of the motor 140 was decreased at (950_1). The operating point is determined at (960_2) if the speed of the motor 140 was increased at (950_2). The elements (960_1) and (960_2) are the same and both implement elements (520)-(540) of the process 500 (FIG. 5). The elements (960_1) and (960_2) are shown as separate elements in FIG. 9 but may be implemented as a single module, function, or collection of machine executable instructions that use an input command that specifies the amount of speed increase or speed reduction, and generate an output command that acts on the inverter 380 to adjust the motor 140 accordingly. The process 900 continues until the determined efficiency is deemed to be acceptable at (545).

Figure 10:
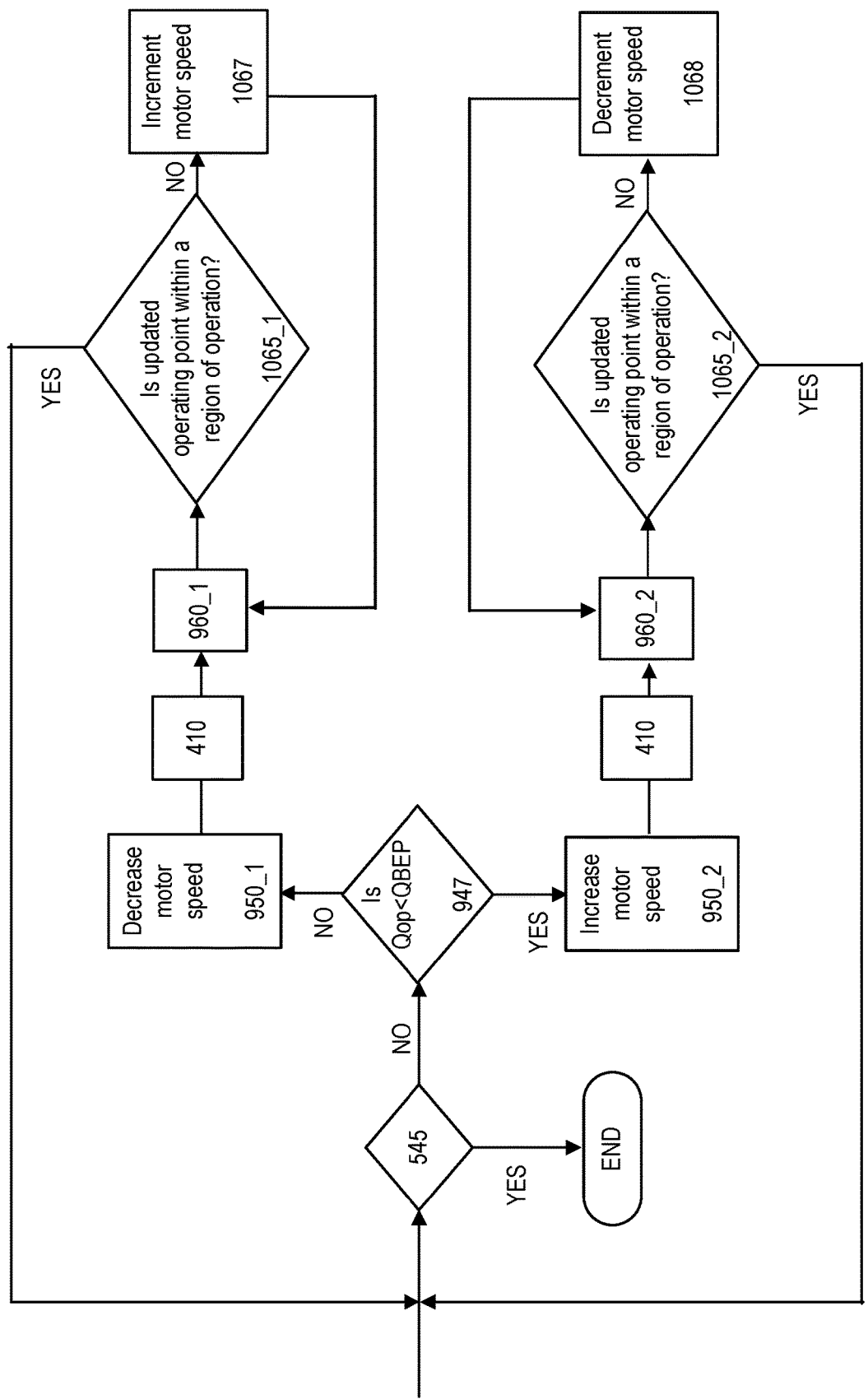

FIG. 10 is a flow chart of a process 1000. The process 1000 is used to bring the centrifugal machine 120 to peak efficiency within a bounded operating region. The bounded operating region may be user-defined and does not necessarily include the flowrate that is associated with the BEP (Q_BEP). The process 1000 may be performed by the controller 150 or the controller 350. For example, machine-readable instructions to implement the process 1000 may be stored on the electronic storage 374 and executed by the electronic processing module 372. The process 1000 is discussed with respect to the fluid management system 300; however, the process 1000 may be applied to other fluid management systems.

The process 1000 includes some elements of the process 500 and 900, which are discussed above. The current operating efficiency (η_op) of the centrifugal machine 120 is assessed for acceptability at (545). If the current operating efficiency (η_op) is not acceptable, the current operating flowrate (Q_op) is compared to the flowrate associated with the BEP (Q_BEP) at (947). The speed of the motor 140 is decreased at (950_1) or increased at (950_2) and the new operating point of the centrifugal machine 120 at the new speed of the motor 140 is determined at (960_1) or (960_2), respectively, as discussed with respect to FIG. 9.

Figure 11:
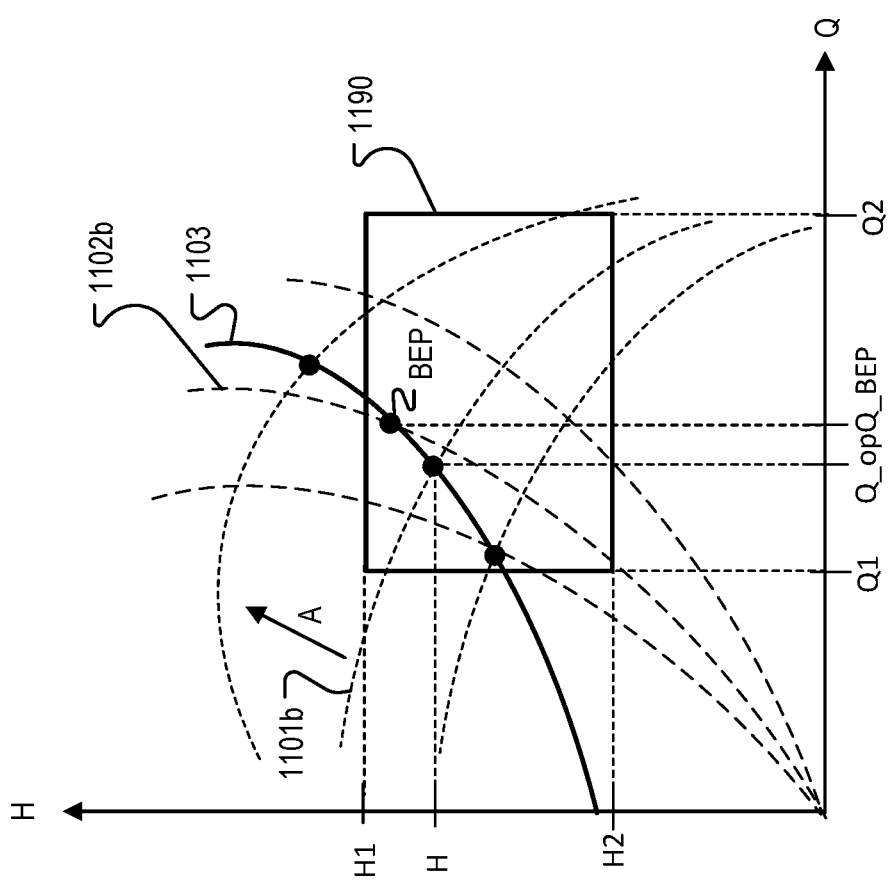

The example in which the current operating flowrate (Q_op) is less than Q_BEP is discussed first. The updated operating point determined at (960_2) includes a head (H) value and a corresponding flowrate (Q_op). FIG. 11 shows an example of an operating point with a head (H) value and a flowrate (Q_op). FIG. 11 also shows a bounded operating region 1190, a system head (Hsys) curve 1103, an H-Q curve 1101*b*, and a maximum efficiency curve 1102*b*. Q_BEP is the point at which the efficiency curve 1102*b* intersects the Hsys curve 1103.

The bounded operating region 1190 is a region in H-Q space that is defined by a maximum head (H2), a minimum head (H1), a minimum flowrate (Q1), and a maximum flowrate (Q2). The bounded operating region 1190 includes H1, H2, Q1, and Q2, and all values of head (H) between H1 and H2, and all values of flowrate (Q) between Q1 and Q2. The bounded operating region 1190 may be defined based on pre-determined values of H1, H2, Q1, and Q2 that are loaded onto the electronic storage 374 by the manufacturer. In some implementations, the operator of the controller 350 is able to enter user-defined values of H1, H2, Q1, and Q2 through the I/O interface 376. Thus, the bounded operating region 1190 may be user-defined and may thus be tailored to the end-user's application.

The process 1000 adjusts the speed of the motor 140 until the centrifugal machine 120 is at the most efficient operating point within the bounded operating region 1190. The values of (Q_op) and head (H) found in (960_2) are compared to H1, H2, Q1, and Q2 to determine if the current operating point is within the bounded operating region 1190 (1065_2). If head (H) is between H1 and H2 and Q_op is between Q1 and Q2, the current operating point (Q_op) is in the bounded operating region 1190. In the example of FIG. 11, the current operating point (Q_op) is in the bounded operating region 1190. The process 1000 returns to (545) to determine whether the current efficiency (η_op) is acceptable. The process 1000 continues until an acceptable efficiency within the operating region 1190 is found.

Figure 12:
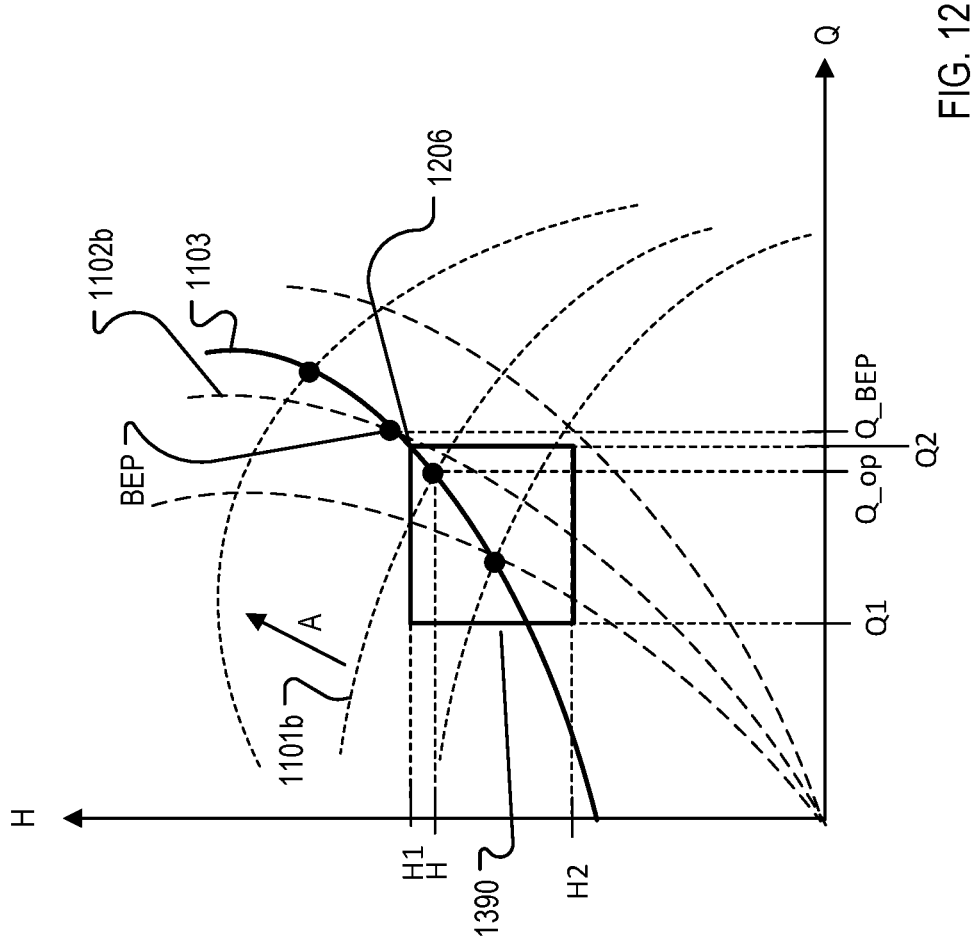

In the example discussed with respect to FIG. 11, Q_BEP is within the bounded operating region 1190. However, the bounded operating region does not necessarily include Q_BEP. FIG. 12 shows an example of another bounded operating region 1290 that does not include Q_BEP. In this example, the current operating point (Q_op) is initially less than Q_BEP, and the speed of the motor 140 is increased (950_2). After the speed of the motor 140 is increased, the speed and torque of the motor 140 are estimated using (410). The current operating point (Q_op and head (H)) are estimated at 960_2. The current operating point Q_op is compared to Q1 and Q2, and the head (H) is compared to H1 and H2 to determine whether the current operating point is within the bounded operating region 1290. In the example shown in FIG. 12, the current operating point is within the bounded operating region 1290. The process 1000 returns to (545) to compare the current flowrate (Q_op) to Q_BEP and continues to increase the speed of the motor 140 until the current operating point determined at (960_2) is determined to be outside of the bounded operating region 1290 at (1065_2). The speed of the motor 140 is then decreased (1068) and the current operating point is determined (960_2) until the current operating point is within the region of operation 1290.

In this example, Q_BEP is not within the region of operation 1290, thus, the speed of the motor 140 is adjusted until Q_op is equal to the flowrate associated with a point 1206. The point 1206 is on the boundary of the bounded operating region 1290 and is on the side closest to the BEP. The point 1206 is considered within the bounded operating region 1290, and the process 1000 returns to (545) and ends because Q_op is now the closest it can be to Q_BEP while also being within the region of operation 1290.

Figure 13:
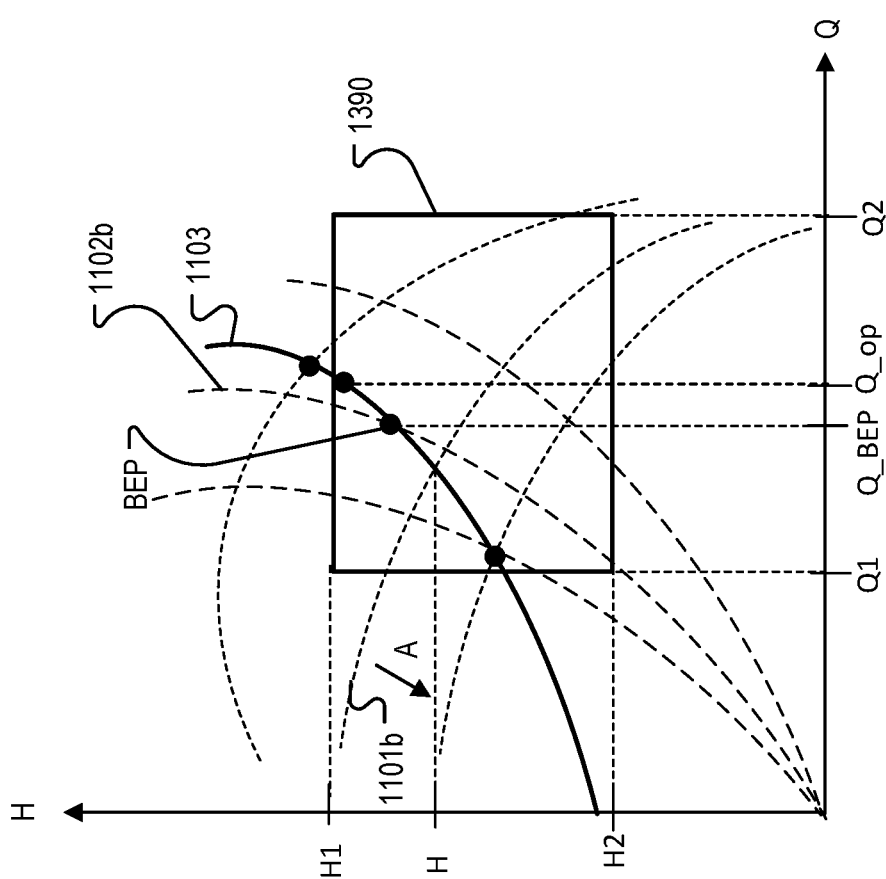

An example in which the current operating flowrate (Q_op) is greater than Q_BEP is discussed next with respect to FIGS. 13 and 14. In the example of FIG. 13, the speed of the motor 140 is decreased (950_1) to bring the current operating point (Q_op) closer to Q_BEP. The speed and torque of the motor 140 are estimated (410), and the new operating point is estimated (960_1). If the new operating point is within the bounded operating region 1390 (such as in the example shown in FIG. 13), the process 1000 returns to (545). The process 1000 continues in this manner until the current flowrate (Q_op) is acceptable.

FIG. 14 shows an example in which Q_BEP is outside of a bounded operating region 1490. The speed of the motor 140 is decreased (950_1) and a new operating point is determined (960_1). The operating point not within the bounded operating region 1490 (1065_1), and speed of the motor 140 is increased (1067). Each time the speed of the motor 140 is increased at (1067), the operating point is estimated (960_1). The speed of the motor 140 is increased until the operating point flowrate (Q_op) is at a point 1406, which is on the boundary of the bounded operating region 1490. The point 1406 is the flowrate in the bounded operating region 1490 that is the closest to Q_BEP. The process 1000 ends because the most efficient flowrate within the bounded operating region 1490 has been determined.

Other implementations of the processes 500, 900, and 1000 are possible. For example, element (545) is discussed above as being an assessment of the efficiency of the centrifugal machine 120 at the current operation point. For example, in the examples above, a difference between the BEP and the current operating efficiency (η_op) is compared to a threshold value. If the absolute value of the difference is less than the threshold, then the current operating efficiency (η_op) is deemed to be acceptable.

However, other implementations of (545) may be used in any of the processes 500, 900, and 1000. For example, in some implementations, (545) determines an absolute value of a difference between the current operating point flowrate (Qop) as determined at (540) and a pre-defined flowrate (Qset), and compares the difference to a threshold (th_Q). If the absolute value of the difference is less than the threshold (th_Q), then the current operating point flowrate is deemed to be acceptable. Implementing (545) in this manner allows the processes 500, 900, and/or 1000 to be used to adjust the centrifugal machine 120 to any set flowrate point (Qset). Moreover, in some implementations, the electronic storage 374 includes instructions to compare the user-supplied Qset value to information about the centrifugal machine 120 to ensure that the value of Qset is a value of the flowrate that is possible to achieve with the centrifugal machine 120.

To provide another example, in some implementations, (545) determines an absolute value of a difference between the current operating head (H) as determined at (540) and a pre-defined or user-supplied head (Hset) value, and compares the difference to a threshold (th_H). If the absolute value of the difference is less than the threshold (th_H), then the current operating head (H) is deemed to be acceptable. Implementing (545) in this manner allows the processes 500, 900, and/or 1000 to be used to adjust the centrifugal machine 120 to any head (H) value. Moreover, in some implementations, the electronic storage 374 includes instructions to compare the user-supplied Hset value to information about the centrifugal machine 120 to ensure that the value of Hset is a value of the head (H) that is possible to achieve with the centrifugal machine 120.

FIG. 15 is a flow chart of a process 1500. The process 1500 is used to operate the centrifugal machine 120 with a varying speed and thus a varying value of a performance metric. The average value of the performance metric equals a user-requested value of that metric. FIG. 16 is a plot of the speed of the impeller 122 or the motor 140 as a function of time. FIG. 17 is a plot of flowrate (a performance metric) of the centrifugal machine 120 as a function of time. FIGS. 16 and 17 have the same time scale. As shown in FIGS. 16 and 17, the speed of the impeller 122 and the flowrate vary over time.

The process 1500 may be performed by the controller 150 or the controller 350. For example, machine-readable instructions to implement the process 1500 may be stored on the electronic storage 374 and executed by the electronic processing module 372. The process 1500 is discussed with respect to the fluid management system 300; however, the process 1500 may be applied to other fluid management systems.

A set point value for a metric is accessed (1510). The set point value may be, for example, a flowrate value (Qset) that an end user enters into the controller 350 using the I/O interface 376. The centrifugal machine 120 is controlled to operate in an on-off manner such that the machine 120 repeatedly alternates between an on state and an off state, and the average value of the metric over time is the set point value (Qset). The metric has a first value during a first time period and a second value during a second time period. When the machine 120 is operated in the on-off manner, the second value of the metric is 0 and the machine 120 is off during the second time period. Continuing the example in which the end user wishes to control the machine 120 to have an average flow rate of Qset and also wishes to control the machine 120 in the on-off manner, Equation (6) shows the relationship between Q1, t2, t1, and Qset:

$$Qset = \frac{(Q1)t1}{t1+t2}, \quad \text{Equation (6)}$$

where t1 is a first finite time period, t2 is a second finite time period, and Q1 is the flowrate during the on state in the first time period t1. For example, the value of Q1 may be Q_BEP. By using Q_BEP as the value of Q1, the centrifugal machine 120 operates in an efficient manner when in the on state. The end user may specify values of t1 or t2. In some implementations, the end user specifies a value of Q1 other than Q_BEP.

The centrifugal machine 120 is controlled to operate at the first value of the metric during the first time period (1520). Continuing the above example and referring to FIGS. 16 and 17, the centrifugal machine 120 is controlled such that the flowrate is Q1 during the first time period t1. The centrifugal machine 120 may be controlled using the process 900, where (545) is configured to assess whether the flowrate of the current estimated operating point is equal to Q1, and the process 900 adjusts the speed of the motor 140 until the flow rate of the operating point is Q1.

The centrifugal machine 120 is controlled to operate at the second value of the metric during the second time period (1530). Continuing the example above, the second value of the flowrate is 0 because the machine 120 is off during the second time period. In this example, the centrifugal machine 120 is controlled by turning the machine 120 off. In other example, the second value of the metric is non-zero, and the machine 120 is controlled using, for example, the process 900 to operate the machine 120 at the second value of the metric in the manner discussed in (520).

These implementations and other implementations are within the scope of the claims.

What is claimed is:

1. A control system comprising:
   a controller configured to:
      access an estimated torque and estimated speed of a motor mechanically coupled to an impeller of a centrifugal machine;
      access at least one set of pre-determined performance data values associated with a known speed of the impeller, wherein each set of pre-determined performance data values comprises: a plurality of flowrate values and a plurality of performance metric values;
      determine an operating point of the centrifugal machine based on the estimated torque, the estimated speed, and the at least one set of pre-determined performance data values;
      compare the determined operating point to a best efficiency point (BEP) associated with the centrifugal machine; and
      determine whether to change the speed of the motor based on the comparison.

2. The control system of claim 1, wherein the controller is configured to access a plurality of sets of pre-determined data values associated with the centrifugal machine, and wherein
   each one of the plurality of sets is associated with a different known speed of the impeller, and the performance metric values comprise pre-determined head values and pre-determined efficiency values, and wherein the plurality of flowrate values, the pre-determined head values, and the pre-determined efficiency values are used to determine the operating point.

3. The control system of claim 2, wherein the controller is further configured to compare the estimated speed of the motor to the different known speeds of the impeller; and
   if the estimated speed of the motor and one of the known speeds are similar to within a speed threshold, the controller is configured to determine a machine power characteristic based on the pre-determined head values and the pre-determined efficiency values; and
   if the estimated speed of the motor and the known speeds are not similar to within the speed threshold, the controller is configured to determine an updated set of head values, and an updated set of efficiency values; and the controller is configured to determine the machine power characteristic based on the updated set of head values and the updated set of efficiency values.

4. The control system of claim 3, wherein the controller is further configured to determine a power value on the machine power characteristic that corresponds to the estimated torque, and wherein the controller is further configured to determine a flowrate operating point, the flowrate operating point being the flowrate value that corresponds to the determined power value.

5. The control system of claim 4, wherein to determine the operating point of the centrifugal machine, the controller is configured to determine an efficiency operating point and a head operating point based on the flowrate operating point.

6. The control system of claim 5, wherein, to compare the determined operating point to the best efficiency point (BEP), the controller is configured to compare the determined efficiency operating point to the best efficiency point (BEP).

7. The control system of claim 6, wherein, if the controller changes the speed of the motor, after changing the speed of the motor, the controller is further configured to:
   to determine an updated set of head values at the flowrate values and an updated set of efficiency values at the flowrate values; and
   the controller is configured to update the machine power characteristic based on the updated set of head values and the updated set of efficiency values.

8. The control system of claim 1, wherein the controller changes the speed of the motor to thereby change a flowrate of a fluid that is moved by the impeller, and the controller is further configured to determine the operating point again after changing the speed of the motor.

9. The control system of claim 1, wherein to determine the operating point of the centrifugal machine, the controller is configured to determine an efficiency operating point.

10. The control system of claim 9, wherein the controller changes the speed of the motor only if the efficiency operating point is unacceptable.

11. The control system of claim 10, wherein the controller is configured to determine whether the efficiency operating point is acceptable by comparing the efficiency operating point to the best efficiency point (BEP).

12. The control system of claim 11, wherein the controller determines that the efficiency operating point is acceptable if an absolute value of a difference between the efficiency operating point and the BEP is less than a threshold value.

13. The control system of claim 1, wherein the controller is configured to
   determine whether the operating point of the centrifugal machine is in a bounded operating region, wherein the operating point comprises a value of a flowrate of fluid moved by the centrifugal machine and a value of a performance metric; and the bounded operating region is defined by a minimum value of the flowrate, a maximum value of the flowrate, a minimum value of the performance metric, and a maximum value of the performance metric; and
   if the operating point is not in the bounded operating region, the controller is configured to adjust a parameter of the motor to thereby change the operating point until the operating point is in the bounded operating region.

14. The control system of claim 1, wherein the performance metric comprises one or more of a flowrate, an operating head, and an efficiency value.

15. A control system comprising:
   a controller configured to:
      access an estimated torque and estimated speed of a motor mechanically coupled to an impeller of a centrifugal machine;
      access a plurality of sets of pre-determined performance data values associated with a known speed of the impeller, wherein each set of pre-determined performance data values comprises: a plurality of flowrate values and a plurality of performance metric values; each one of the plurality of sets is associated with a different known speed of the impeller, and the performance metric values comprise pre-determined head values and pre-determined efficiency values;

determine an operating point of the centrifugal machine based on the estimated torque, the estimated speed, and plurality of sets of pre-determined performance data values;

compare the determined operating point to a best efficiency point (BEP) associated with the centrifugal machine; and determine whether to change the speed of the motor based on the comparison; and wherein the controller is further configured to compare the estimated speed of the motor to the different known speeds of the impeller; and if the estimated speed of the motor and one of the known speeds are similar to within a speed threshold, the controller is configured to determine a machine power characteristic based on the pre-determined head values and the pre-determined efficiency values; and if the estimated speed of the motor and the known speeds are not similar to within the speed threshold, the controller is configured to determine an updated set of head values, and an updated set of efficiency values; and the controller is configured to determine the machine power characteristic based on the updated set of head values and the updated set of efficiency values.

16. The control system of claim 15, wherein the controller is further configured to determine a power value on the machine power characteristic that corresponds to the estimated torque, and wherein the controller is further configured to determine a flowrate operating point, the flowrate operating point being the flowrate value that corresponds to the determined power value.

17. The control system of claim 16, wherein to determine the operating point of the centrifugal machine, the controller is configured to determine an efficiency operating point and a head operating point based on the flowrate operating point.

18. The control system of claim 17, wherein, to compare the determined operating point to the best efficiency point (BEP), the controller is configured to compare the determined efficiency operating point to the best efficiency point (BEP).

19. The control system of claim 18, wherein, if the controller changes the speed of the motor, after changing the speed of the motor, the controller is further configured to:
to determine an updated set of head values at the flowrate values and an updated set of efficiency values at the flowrate values; and
the controller is configured to update the machine power characteristic based on the updated set of head values and the updated set of efficiency values.

20. The control system of claim 15, wherein the controller changes the speed of the motor to thereby change a flowrate of a fluid that is moved by the impeller, and the controller is further configured to determine the operating point again after changing the speed of the motor.

* * * * *